(12) United States Patent
Robinson

(10) Patent No.: US 8,469,060 B2
(45) Date of Patent: Jun. 25, 2013

(54) CLAMP AND WRAPPING ASSEMBLY FOR PATCHING A PIPE RUPTURE

(75) Inventor: Jeffery Robinson, Melbourne (AU)

(73) Assignee: Commonwealth of Australia Department of Defence, Canberra (AU)

( * ) Notice: Subject to any disclaimer, the term of this patent is extended or adjusted under 35 U.S.C. 154(b) by 0 days.

(21) Appl. No.: 13/130,137

(22) PCT Filed: Nov. 19, 2009

(86) PCT No.: PCT/AU2009/001507
§ 371 (c)(1),
(2), (4) Date: Aug. 9, 2011

(87) PCT Pub. No.: WO2010/057256
PCT Pub. Date: May 27, 2010

(65) Prior Publication Data
US 2011/0290360 A1 Dec. 1, 2011

(30) Foreign Application Priority Data

Nov. 19, 2008 (AU) .................................. 2008905980

(51) Int. Cl.
*F16L 55/16* (2006.01)
(52) U.S. Cl.
USPC .............................................. 138/99; 138/98
(58) Field of Classification Search
USPC ........................................ 138/99, 98; 428/63
See application file for complete search history.

(56) References Cited

U.S. PATENT DOCUMENTS

| 1,027,155 | A | * | 5/1912 | Robbins .......................... 138/99 |
| 1,071,265 | A | * | 8/1913 | McRae et al. ................. 298/17.6 |
| 1,290,041 | A | * | 1/1919 | Anderson ........................ 138/99 |
| 1,638,269 | A | * | 8/1927 | Mullinack ....................... 138/99 |
| 2,182,258 | A | * | 12/1939 | Kirk ................................ 138/99 |
| 3,591,142 | A | | 7/1971 | Hatcher |
| 4,083,588 | A | | 4/1978 | Berger |
| 5,002,093 | A | * | 3/1991 | Connolly, Jr. .................. 138/99 |
| 6,095,784 | A | | 8/2000 | Wickizer |
| 2004/0183293 | A1 | | 9/2004 | Elliott |

FOREIGN PATENT DOCUMENTS

| DE | 3546172 | 7/1987 |
| FR | 2787173 | 6/2000 |
| GB | 1523201 | 8/1978 |
| RU | 1753179 | 8/1992 |

OTHER PUBLICATIONS

International Search Report for PCT/AU2009/001507 issued Feb. 8, 2010.
International Preliminary Report on Patentability for PCT/AU2009/001507 issued Feb. 17, 2011.

* cited by examiner

*Primary Examiner* — Patrick F Brinson
(74) *Attorney, Agent, or Firm* — Edwards Wildman Palmer LLP

(57) ABSTRACT

The present invention relates to a clamp that can be used for repairing a rupture in a pipe. The clamp includes a wrapping assembly comprising strapping that at least partially extends about the pipe, an adjustment device that is suitably in form of a claps for adjusting the effective length of the strapping about the pipe and a tensioning device that is suitably in the form an over center lever mechanism that is operable to place the wrapping assembly under different tensions.

26 Claims, 10 Drawing Sheets

CLAMP AND WRAPPING ASSEMBLY FOR PATCHING A PIPE RUPTURE

CROSS REFERENCE TO RELATED APPLICATIONS

This application is the national stage of International Application No. PCT/AU2009/001507, filed Nov. 19, 2009, which application claims priority to Australian Pat. App. No. 2008905980, filed Nov. 19, 2008, the contents of which are incorporated herein by reference.

FIELD OF THE PRESENT INVENTION

The present invention relates to a clamp and in particular to a clamp that can be used for repairing a rupture in a pipe in any application such as a water main or a fire main of a maritime vessel. The clamp may be used in any industrial application including pipelines of chemical processing plants.

BACKGROUND OF THE PRESENT INVENTION

There are at present a vast number of different clamps commercially available. An example of a clamp that has been widely used and is available under the trade mark BAND-IT comprises: i) steel strapping that is cut from a reel at any chosen length, and ii) a buckle through which the strapping is threaded to form a loop around an object being clamped. A tensioning tool is fitted and operated to tension the steel strapping wrapped about the object and the buckle is crimped closed to prevent the strapping from sliding through the buckle to maintain the required tension. The tensioning tool is removed and the strapping extending from the buckle cut from the reel and trimmed as desired. One of the disadvantages of this type of clamp is that the cut end of the steel strapping has been known to cause lacerations. In addition, the clamp requires an inventory of tools and usually multiple personnel to fit the strapping about the object being clamped.

Many alternative clamps are also commercially available such as conventional hose clamps, and two piece clamps of fixed diameter that are bolted together.

It is an object of the present invention to provide an alternative clamp.

SUMMARY OF THE PRESENT INVENTION

According to the present invention there is provided a clamp suitable for patching a rupture in a pipe, the clamp comprising:

a wrapping assembly that can at least partially encircle a pipe and be positioned on a rupture of the pipe, wherein the wrapping assembly includes strapping and an adjustment device for adjusting the effective length of the strapping that is wrapped about the pipe; and a tensioning device that is operable to place the wrapping assembly about the pipe under different tensions so as to allow pressure applied by the wrapping assembly to the rupture to be adjusted.

It will be appreciated that the tensioning device can be operable so that the clamp may either entirely or only partially prevent leakage from the pipe.

In an embodiment, the adjustment device can frictionally engage the strapping at any desired point to selectively set the effective length of the strapping.

In an embodiment, the adjustment device includes an abutment surface and the strapping can slid through the adjustment device so as to frictionally engage the abutment surface at the desired point along the strapping to selectively set the effective length of the strapping. In other words, the strapping can slid through the adjustment device in a continuously progressive manner to achieve the desired effective length of the strapping.

In an embodiment, the wrapping assembly is releasably connected to the tensioning device to allow the clamp to be installed about the pipe.

When in use, the wrapping assembly may encircle one part of the pipe and the tensioning device may encircle the remaining part of the pipe to totally encircle the pipe. In other words, the wrapping assembly encircles part of the pipe and the tensioning device straddles between or interconnects the wrapping assembly so that the clamp extends continuously around the pipe.

In an embodiment, the effective length of the strapping encircles at least part of the pipe and passes through the adjustment device, and an end of the strapping extends from the adjustment device and the effective length can be reduced by pulling on the end extending from the adjustment device so as to slide the strapping through the adjustment device.

By pulling on the strapping, the adjustment device provides a coarse level of adjustment so that the device can be fitted to pipes of various sizes.

The strapping may be any form of strapping including steel strapping, plastic webbing or fabric strapping. In the situation in which the strapping is, for example a fabric type of strapping, the adjustment device may be any suitable device including inter-fitting male and female snap lock clips; sliding adjustors; sliding buckles having strapping threaded there through that can slide through the buckle; buckles having pins that receive one of a series of holes in the strapping to fix the effective length of the strapping in position. In an embodiment, the adjustment device includes a clasp having an open and closable flap and the strapping is wedged between the flap in a closed position and the abutment surface, thereby securing the effective length of the strapping.

The clasp is configured such that the flap contacts the strapping passing through the clasp and tension in the strapping pulls the strapping in a direction through the clasp that moves the flap toward the abutment surface, thereby wedging the strapping between the flap and the abutment surface.

The flap may also be biased, suitably by a spring, in a direction that moves the flap toward the Abutment surface.

In order to release the tension in the strapping, the flap can be manually moved away or lifted into a neutral non-engaging position in which the strapping is not wedged between the flap and the abutment surface. The effective length of the strapping can be increased by moving the flap into the neutral position which allows the strapping to slide through the adjustment device.

The strapping may be used in any configuration including a single layer in which the strapping extends from one point of the wrapping assembly to the adjustment device. In an embodiment the strapping is arranged in a loop in which the strapping extends from the adjustment device and loops back and through the adjustment so that the effective length of the strapping is formed by two sub-sections of the strapping.

The tensioning device may comprise any mechanism for tensioning the device about the pipe including: a ratchet mechanism; a latch mechanism; a rack and pinion mechanism; a geared mechanism; a screw threaded mechanism; a winding mechanism and so forth.

In an embodiment, the tensioning device includes a lever mechanism that can be moved between an unloaded neutral position in which the wrapping assembly is located in an initial circumferentially expanded state and a loaded working position in which the wrapping assembly is located in a circumferentially contracted state.

Suitably, the lever mechanism is an over centre lever mechanism in which moving the lever from an unloaded neutral position to a loaded position involves pivoting the handle through a region in which the load in the mechanism peaks, and in turn the tension of the wrapping assembly peaks. In other words, when the lever is located in the loaded working position, the lever requires external influences to be moved into the unloaded neutral position.

Similarly, when the handle is moved from an unloaded neutral position to a loaded working position, the handle passes through the region in which the load on the mechanism is at a peak, and in turn the tension of the wrapping assembly peaks.

In an embodiment, the clamp includes a lock that locks the tensioning device so as to prevent the device from unintentionally releasing or moving from the loaded working position to the neutral unloaded position. The lock may be operable so as to be selectively activated or locked, and deactivated or unlocked when the tensioning device is located in the loaded locking position.

In the situation in which the tensioning device is in the form a lever mechanism, suitably the lock is operable to selectively allow or prevent pivotal movement of the lever when in the loaded working position. Even more suitably, the locking mechanism includes a strap, which may or may not extend from the strapping that is wrapped about the pipe, and which connects to the handle of the lever mechanism to retain the handle in the loaded working position.

In an embodiment, the lever mechanism includes a handle that is pivotally connected to the wrapping assembly at a first pivot point and the lever mechanism further includes a linkage arm that is pivotally connected to the handle at a second pivot point. The linkage arm may be pivotally connected to the wrapping assembly at a further pivot point. In this situation, the wrapping assembly and lever mechanism totally encircle the pipe when fitted thereto.

In an embodiment, the lever mechanism includes an adjustor for adjusting the load or purchase of the lever mechanism when in the loaded working position.

In an embodiment, the adjustor is operable to move the location of the second pivot point at which the linkage arm is pivotally connected to the handle along either one of the handle and/or the linkage arm in a continuous progression. Suitably, to increase the load on the lever mechanism, the adjustor is operatable to move the second pivot point away from the first pivot point of the handle to the wrapping assembly and to reduce the load on the lever mechanism, the adjustor is operatable to move the second pivot point toward the first pivot of the handle and the wrapping assembly.

In an embodiment, the adjustor includes:

i) a shaft that is moveable within a housing, suitably the housing is connected to or integrally formed with the handle, and the linkage arm is pivotally connected to the shaft; and ii) a stopping piece that can be moved along the shaft, and the stopping piece abuts against the housing and is thus operable to move the point of connection between the linkage arm and the handle.

In an embodiment, the shaft is a screw threaded shaft and the stopping piece is a wing nut that is finger adjustable when the lever is in an unloaded neutral position.

It will be appreciated that the clasp of the strapping described above provides a first means for adjusting the size of the clamp and in particular enables a coarse level of adjustment to an initial expanded circumference. Operation of the lever mechanism from the unloaded position to a loaded working position then further reduces the circumference of the clamp to a contracted circumference. The size of contracted circumference of the clamp can be tuned to a fine level by operation of the adjustor as desired by releasing the lever to the unloaded position, operating the adjustor, and moving the lever back into the loaded working position.

In an embodiment, the linkage arm comprises one or more than one non-linear members that are shaped to extend over the pivot connection of the handle to the wrapping assembly.

In an embodiment, the lever mechanism includes a cam body that interconnects the linkage arm to the wrapping assembly, and the cam body is pivotally connected to the wrapping assembly at a first spacing from the pipe to which it is fitted, and the cam body is pivotally connected to the linkage arm at a second spacing from the pipe that is greater than the first spacing.

The clamp may include a patch for covering a rupture in the pipe or alternatively, the patch may be an entirely separable component from the wrapping assembly or tension device. In the situation in which the patch is connected to the clamp, and suitably forming part of the wrapping assembly, the patch includes a metal plate or band which is preferably in the form of a spring stainless steel band.

The plate or band may be rigid and have any pre-formed curvature to fit a range of the pipe sizes. However, in an embodiment, the plate or band is flexible and can bend about pipes of various diameters. For instance, the clamp may be used to patch fire mains ranging from 4 to 8 inches in diameter. In another application, the clamp may be used for patching a rupture of a transfer pipe of any industrial, scientific or commercial applications including petrochemical plants, water treatment plants, chemical plants and alike.

The patch may also include a sealing medium on the inside face of the patch to assist in creating a liquid or fluid tight seal when fitted to a pipe.

The sealing medium may be any suitable material depending on the particular application and the fluid being transported in the pipe. In the situation in which the fluid being handled is water, suitably the sealing medium is a rubber or polymeric based material. In the instance in which the fluid being handled is a hydrocarbon such as oil, suitably the sealing material is a Teflon™.

In the situation in which a patch is a separate component and, therefore, does not form part of the clamp, suitably a patching material can be held to the rupture in the pipe by the strapping or the tensioning device of the clamp. Similarly, even in the situation in which the patch forms a part of the wrapping assembly, it is possible for additional extraneous material to be located between the patch and rupture of a pipe, for example, to improve the seal between the patch and external wall of the pipe.

In an embodiment, the strapping is releasably connected to the patch. The releasable connection may be formed by any suitable mechanism but is suitably in the form of co-operating male and female components, and even more suitably in the form of a peg extending outwardly from the patch and a ring formation on the strapping that releasably receives the peg.

When the strapping is released from the patch, the clamp can be readily fitted over a pipe and reconnected to encircle the pipe. The adjustment device is then operable to adjust the wrapping assembly and the tensioning device about the pipe.

In the situation in which the clamp does not include a patch, the wrapping assembly may be releaseably connected to the tensioning device, for example by buckles, to allow the clamp to be installed about the pipe.

In an embodiment, the clamp comprises only one wrapping assembly and only one tensioning device. In an alternative embodiment, the clamp may comprise two or more wrapping assemblies that may or may not be interconnected and each wrapping assembly has a tensioning device. The wrapping assemblies may be interconnected by one or more patches or plates.

BRIEF DESCRIPTION OF THE DRAWINGS

Preferred embodiments of the present invention will now be described by way of example with reference to the accompanying drawings, of which.

DETAILED DESCRIPTION

Figure 1:
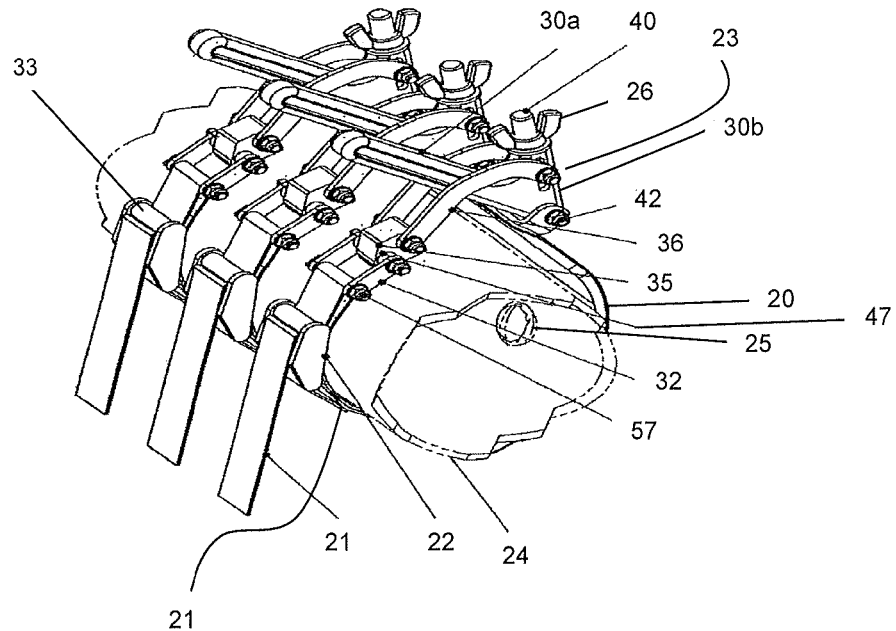
FIG. 1 is left perspective view of a clamp according to a preferred embodiment that is in the process of being fitted to a pipe comprising of three interconnected clamping assemblies, each having a lever handle that is located in an unloaded neutral position.
Figure 2:
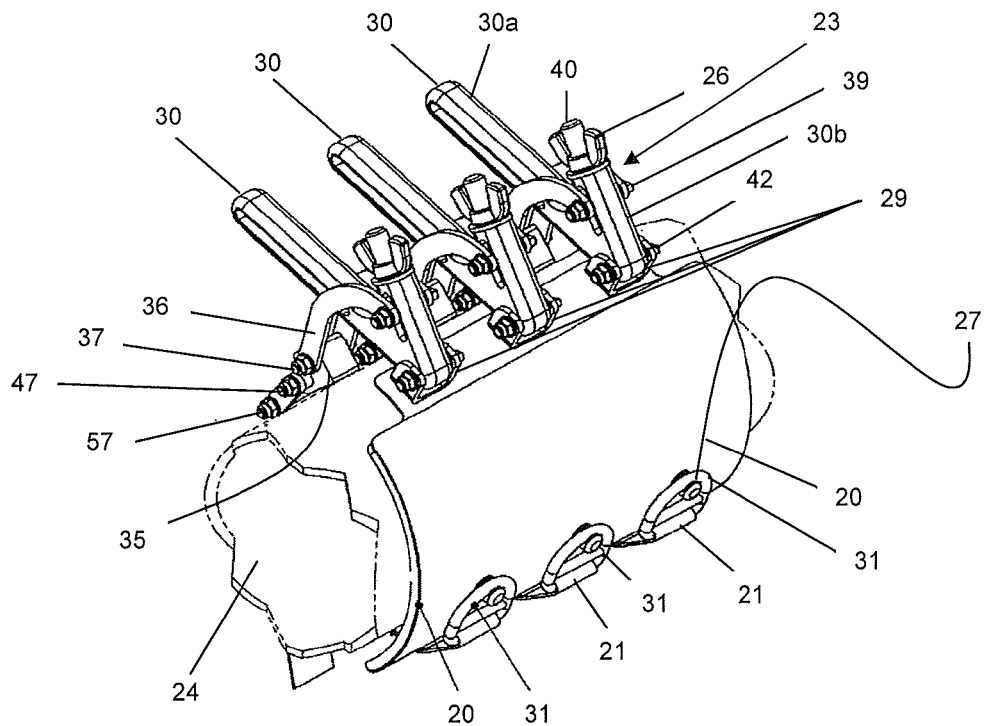
FIG. 2 is a right perspective view of the clamp shown in FIG. 1.
Figure 3:
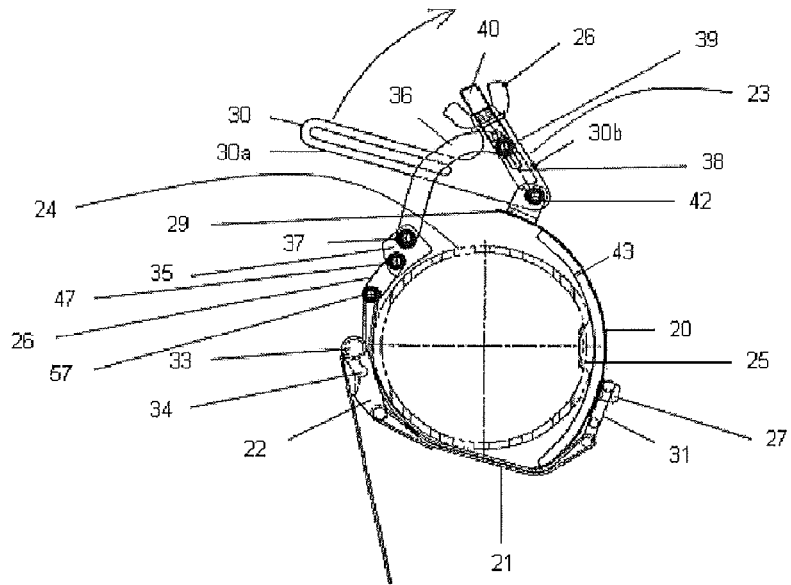
FIG. 3 is end view of the clamp shown in FIG. 1.
Figure 4:
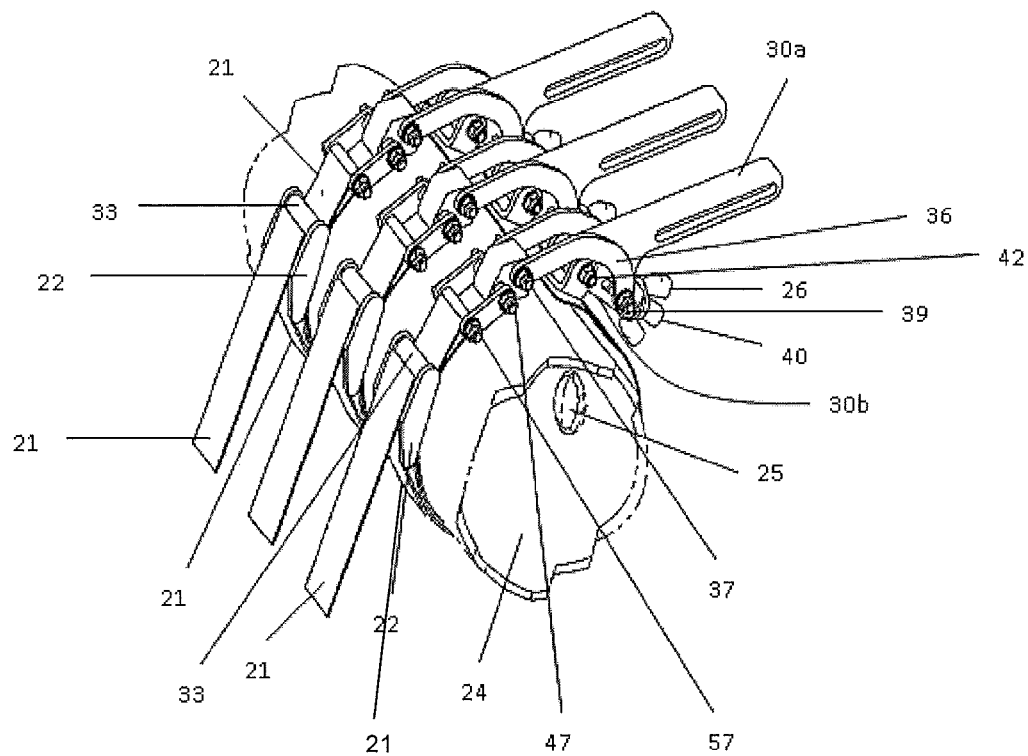
FIG. 4 is the same view of the clamp shown in FIG. 1 save for the clamp being located in a loaded working position.
Figure 5:
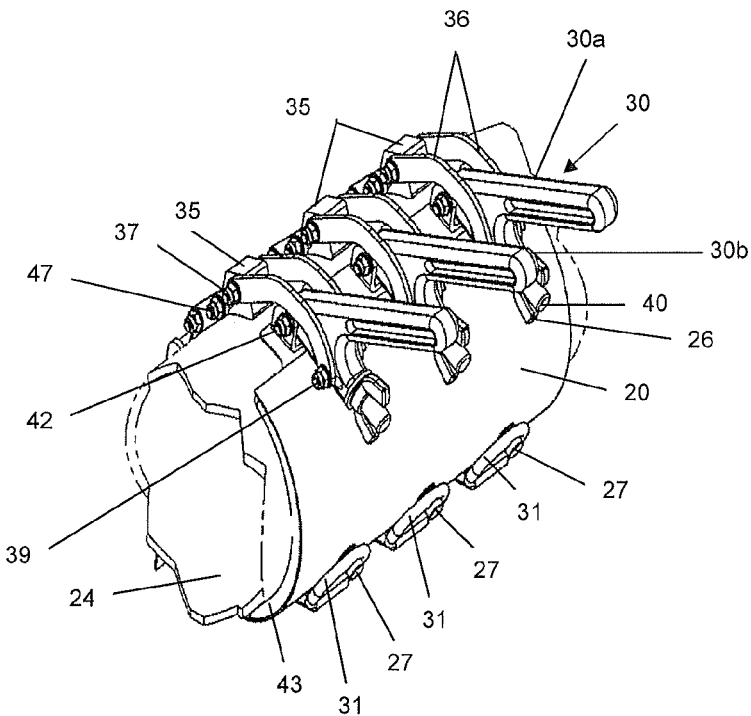
FIG. 5 is the same view of the clamp shown in FIG. 2 save for the clamp being located in a loaded working position.
Figure 6:
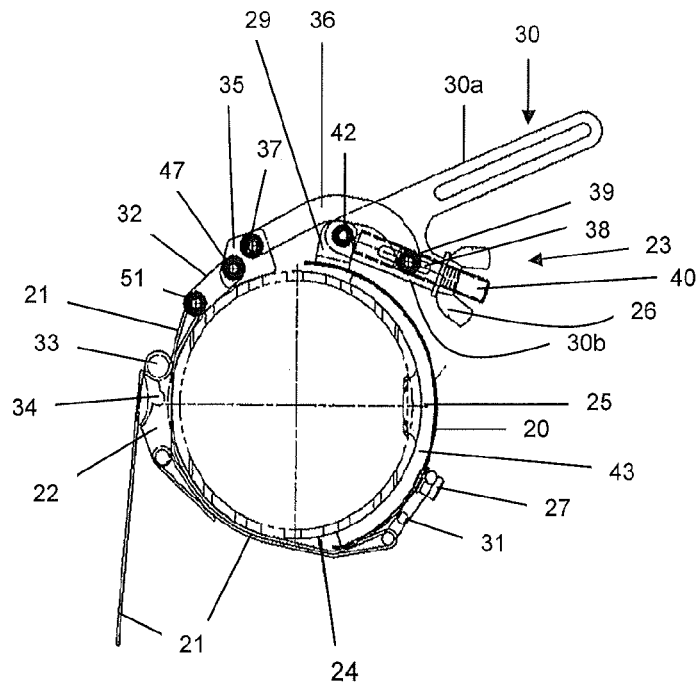
FIG. 6 is the same view of the clamp shown in FIG. 3 save for the clamp being located in a loaded working position.

FIGS. 1 to 3 illustrate three separate views of a single clamping device fitted to a pipe comprising three wrapping assemblies, each having a lever handle that is located in an unloaded neutral position in which the clamp is loosely fitted around the pipe. FIGS. 4 to 6 illustrate the same views of the device shown in FIGS. 1 to 3, save for the lever handles being pivoted into a loaded working position. The device shown in FIGS. 1 to 3 and the device shown in FIGS. 4 to 6 therefore comprise the same features and for the purpose of the complete description of the device, it is only necessary to describe the device in detail with reference to FIGS. 1 to 3. The same reference numerals have been used on FIGS. 4 to 6 to label the same features of the device in FIGS. 1 to 3.

Although the components of the device have been allocated a reference numeral in the following text, in order to maintain clarity of the Figures, all of the components have not been labelled with its respective reference numeral in every Figure. However, the reference numerals used in the text are shown in at least one of the Figures.

Figure 13:
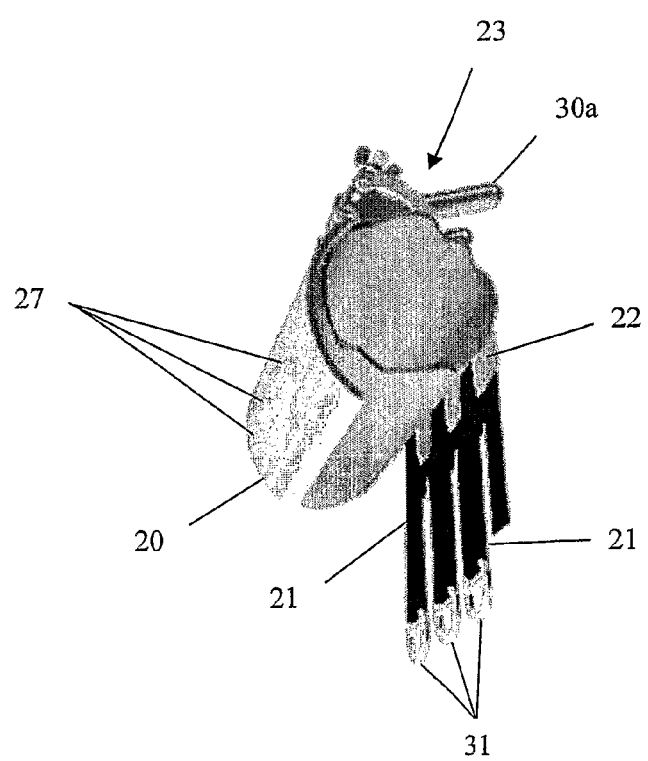
FIG. 13 is a schematic underneath view of a clamp according to another embodiment being fitted to a pipe, the clamp comprising of three wrapping assemblies each including a disconnected strap and a tension device in the form of an over centre lever mechanism comprising a pivoting handle located in a unloaded neutral position.
Figure 14:
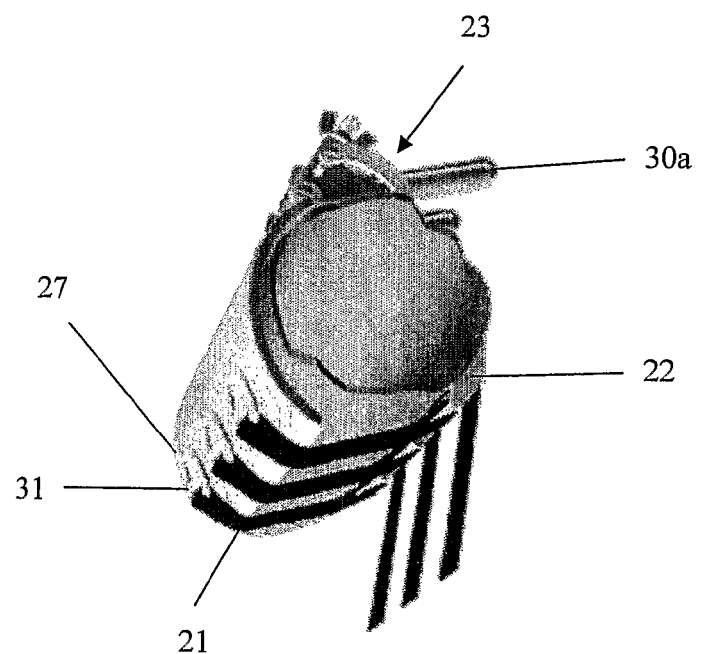
FIG. 14 is the schematic view shown in FIG. 13 with the straps connected to a base plate of the wrapping assembly.

The clamp comprises a wrapping assembly in the form of a resiliently flexible base plate 20, looped straps 21 with an adjustment device in the form of a clasp 22, and an over centred lever mechanism 23. As best seen in FIGS. 13 to 17, the clamp is initially fitted to a pipe 24 of any size by disconnecting the straps 21 from the base plate 20 and placing the plate 20 over the rupture 25 in the pipe 24 in the manner shown in FIG. 13, the straps 21 are then connected to the base plate 20 as shown in FIG. 14 and the free ends of the straps 20 pulled so as to fit the clamp around the pipe, and thereby provide a coarse level of adjustment. Adjustable wing nuts 26 on the over centre lever mechanism 23 can then be adjusted in the direction of the arrow shown in FIG. 15 to provide a finer level of adjustment of the clamp.

Figure 15:
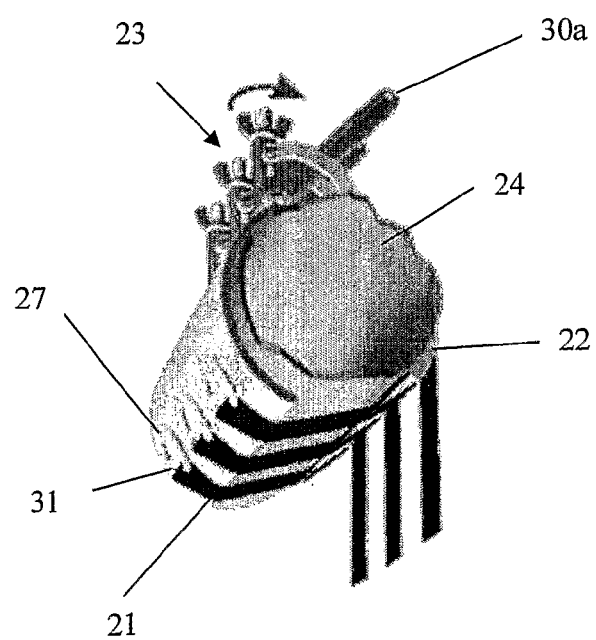
FIG. 15 is the schematic view shown in FIGS. 13 and 14 wherein the straps have been manually tightened and wing nuts on the handle tightened in the direction of the arrow.
Figure 16:
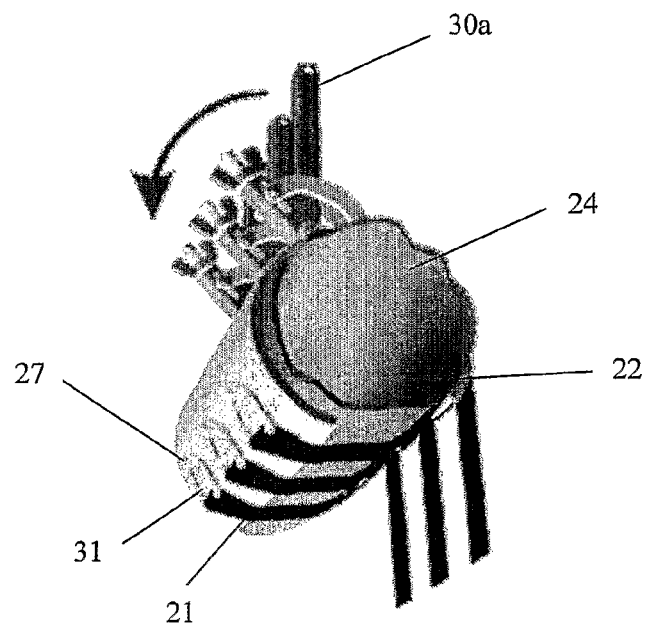
FIG. 16 is the schematic view shown in FIGS. 13 to 15 wherein the handle is in the process of being pivoted in the direction of the arrow into a loaded working position.
Figure 17:
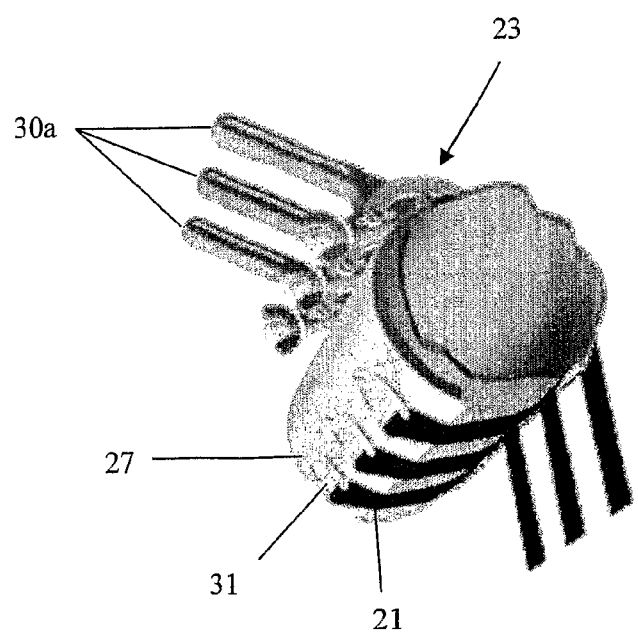
FIG. 17 is the schematic view shown in FIGS. 13 to 16 wherein the handle is located in the loaded working position.

As shown in FIGS. 15 to 17, the over centre lever mechanism 23 can be pivoted in the direction of the arrow shown in FIG. 16 from an unloaded neutral position to a loaded working position whereby the assembly is held taught around the pipe 24. In the event that leakage from the rupture 25 in the pipe 24 is inadequately sealed by the clamp, the lever mechanism can be released and finer adjustment of the wing nuts 26 can be undertaken followed by movement of the handles back into a loaded working position.

Figure 11:
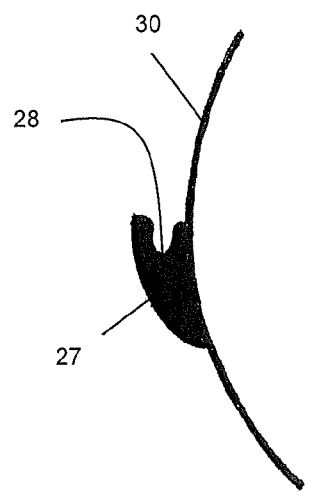
FIG. 11 is a perspective view of a part of the embodiment of the clamp shown in FIGS. 1 to 6.

The preferred embodiment shown in FIGS. 1 to 3 comprises a single flexible base plate 20 which is connected to three straps 21 and three over centre lever mechanisms 23. FIG. 11 shows a perspective view of the plate 20 in isolation which forms part of the clamp shown in FIGS. 1 to 6. As can be seen, at the lower end of the plate 20, three pegs 27 protrude outwardly and each of the pegs 27 has an upwardly facing U-shape formation 28. The opposite upper edge of the plate 20 comprises three saddle formations 29 to which a handle 30 of the over centre lever mechanism 23 is pivotally mounted. The strapping includes a D-shaped formation 31 which can be connected and disconnected from each of the pegs 27 as desired. The layout of the strapping is such that the strapping extends from the clasp 22 to the D-shaped formation 31 through which it is threaded, and then looped back over a linkage 32 inter-connecting the strapping 21 to the lever mechanism 23 and then finally through the clasp 22. The clasp 22 includes a spring loaded flap 34 that is biased toward an abutment rod 33 which extends across the width of the clasp 22. The end of the flap 34 and the abutment rod 33 are arranged such that tension in the strapping 21 causes the flap 34 of the clasp 22 to move toward the abutment rod 33, thereby wedging the strapping 21 between the flap 34 and the abutment rod 33. When the device has been fitted over a pipe 24 as shown in FIG. 13, the D-shaped formation 31 can be fitted to the pegs 27 of the plate 20 and the free end of each strapping 21 can be pulled to adjust the effective length of the strapping 21 wrapping about the piping 24 to a desired tension. In order to lengthen the loops of strapping and, in turn the effective length of the strapping 21 about the piping 24, the flap 34 is lifted to allow the strapping 21 to slide through the clasp 22. It would be appreciated that the clasp 22 and strapping 21 thereby provide a coarse level of adjustment for fitting the device to pipe 24.

The handle 30 of the lever mechanism 23 has a V-shape that is pivotally mounted to the saddle formation 29 on the base plate 20 at pivot point 42. The V-shaped handle 30 comprises a major limb 30a which provides a grip by which the lever is operated and a minor limb 30b having a compartment in which an adjustor in the form of a screw threaded shaft 40 is slidably housed. Either side of the compartment has a slot 38 and ends of the linkage arms 36 are aligned with a fastening bolt 39 that extends through holes in the ends of a linkage arms 36, the slots 38 and holes in the screw threaded shaft 40. The fastening bolt 39 defines an axis about which the linkage arms 36 are pivotally connected to the lever 23 and, in particular, to the minor limb 30a thereof. A butterfly or wing nut 26 is fitted to an outside end of the screw threaded shaft 40 such that rotation of the wing nut 26 can move the pivot connection defined by the bolt 39 between the linkage arms 36 of the screw threaded shaft 40 in a direction along the slots 38 of the minor limb 30b of the handle 30. In other words, rotation of the wing nut 26 moves the pivot connection between the minor limb 30b of the lever 23 and the linkage arms 36 either towards or away from the pivot point 42 of the lever 23. In order to increase the tension of the clamp around the pipe, the wing nut 26 is rotated to move the pivot connection defined by bolt 39 in a direction away from the pivot point 42 of the lever 23. Conversely, in order to loosen the pressure of the clamp around the pipe 24, the wing nut is rotated so as to move the pivot connection defined by bolt 39 in a direction toward the pivot point 42 of the lever 23. It would be appreciated that the adjustable nature of the pivot connection between the linkage arms 36 and the lever 23 provides a second and finer level of adjustment of the tension of clamp about the pipe 24.

The pairs of linkage arms 36 are connected to each strapping 21 via a cam body 35 and linkage 32. In particular, each pair of linkage arms 36 are pivotally mounted to the cam body 35 via a fastening bolt that defines a pivot axis 37, which is best seen in FIGS. 3 and 6 as extending through an upper portion of the cam body 35.

The linkage 32 essentially comprises two plates that are pivotally connected to the cam body 35 via a fastening bolt that defines a pivot axis 47. A further fastening bolt at the opposite end of the plates defines an axis 57 about which the strapping 21 is located. As can best be seen FIGS. 3 and 6, the pivot axis 37 of the linkage arms 36 to the cam body 35 extends through the cam body 35 at a spacing from piping 24 that is greater than the spacing of the pivot axis 47 the piping 24.

As can be best seen in FIG. 6, each linkage arm 36 is curved such that when the lever 23 is located in a loaded position, the linkage arms 36 extend over the pivot point 42 at which fastening bolt pivotally mounts the lever 23 to the saddle formation 29 on the base plate 20.

In addition, each linkage arm 35 is pivotally connected to the cam body 35 at pivot axis 37 that is displaced from the pipe 24 to reduce the degree of curvature and/or length of the linkage arms 35 that would otherwise be required.

FIG. 3 illustrates an end view of the clamp in which the lever 23 is located in an unloaded neutral position in which the wrapping assembly comprising base plate 20 and straps 21 are located in an initial circumferentially expanded state about the pipe 24. In other words, the straps 21 have been fitted and adjusted to an initial tension. In order to put the clamp in a working condition, the lever 23 is pivoted in the direction of the arrow shown in FIG. 3, so as to locate the lever 23 into a loaded working position as shown in FIGS. 4 to 6. As can best been seen in FIG. 6, when the lever 23 is located in a loaded working position, the wrapping assembly comprising base plate 20 and straps are located in a circumferentially contracted state about the pipe 24. As described above, the wing nuts 26 enable the size of the circumferentially contracted state of the clamp 23 about the pipe 24 to be gradually or progressively adjusted.

In moving the lever 23 in the direction of the arrow into the loaded working position, the lever passes through a peak load or tension position before reaching the loaded working position to provide an over centre effect. The over centre effect helps retain the lever mechanism in the loaded position and in order to move the lever into an unloaded position, an operator is required to move the lever 23 from loaded working position into a direction work the unloaded neutral position.

In addition to the above, it will be appreciated that the inside face of the base plate 20 may comprise any suitable material 43 for forming a seal with a rupture in the pipe.

Figure 7:
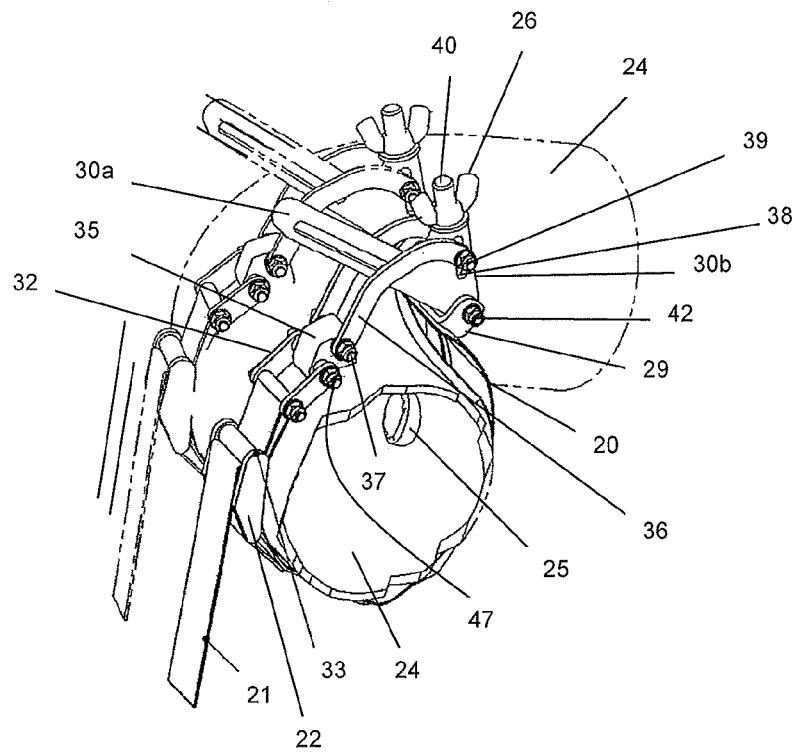
FIG. 7 is a left perspective view of two clamps fitted side-by-side to a curved pipe according to another preferred embodiment, each clamp comprising a handle lever that is located in an unloaded neutral position.
Figure 8:
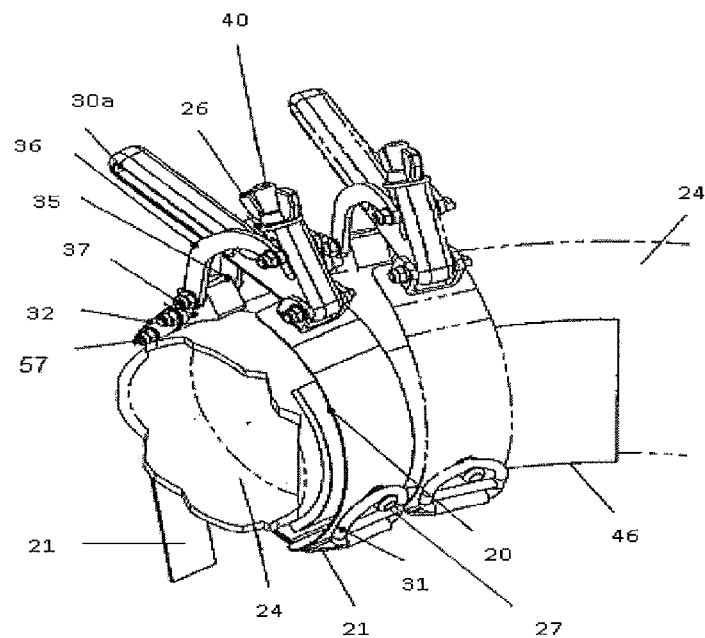
FIG. 8 is a right perspective view of the clamps shown in FIG. 7.
Figure 9:
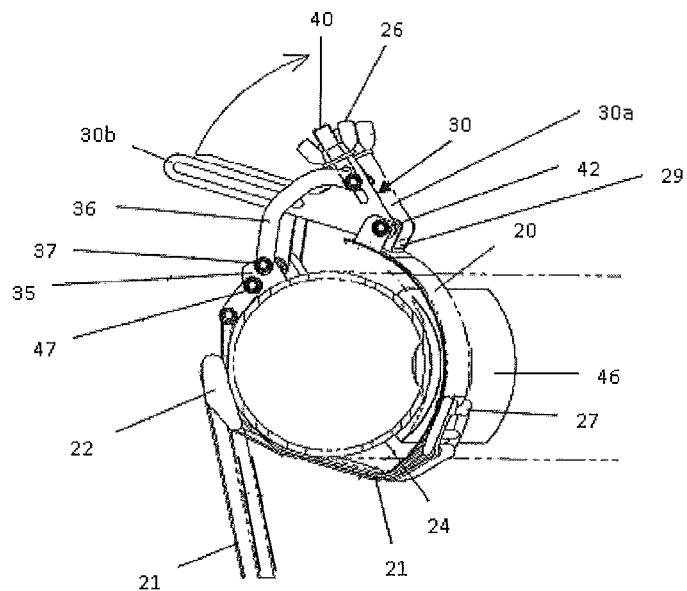
FIG. 9 is an end view of the clamps shown in FIGS. 7 and 8.

FIGS. 7 to 9 illustrate another preferred embodiment of the present invention. In particular FIGS. 7 and 8 illustrate two clamps fitted to a pipe, wherein each clamp comprises a single base plate 20, a strap 20 with locking clasp 22 and a tensioning device in the form of an over centred lever mechanism 23. All of the features of the clamp shown in FIGS. 7 to 9 are substantially the same as the features of the clamps shown in FIGS. 1 to 6 save for each wrapping assembly comprising a single base plate 20 rather than a continuous base plate 20 interconnecting three straps 21. In summary, in addition to the base plate 20, each clamp comprises looped strapping 21 with an adjustment device in the form of a claps 22 and an over centre lever mechanism 23. The strapping 21 is releasably attached to the base plate via a peg 27 on the base plate 20 and a D-shaped formation 31 that defines an end of the strapping 21 about which the strapping is looped in a U-shape. The over centre lever mechanism 23 includes a handle 30 having a V-shape that is pivotally mounted to the base plate 20 at pivot point 42 by a saddle formation 29 and bolt. The V-shaped handle includes a major limb 30b and minor limb 30a having an internal compartment in which a screw threaded shaft 40 having a butterfly wing nut 26 is fitted. The screw threaded shaft is pivotally connected to ends of a pair of curved linkage arms 36 and the other ends are connected to the cam block 35. The cam block 35 is connected to the straps 32 via a linkage 32. Operation of the clamp shown in FIGS. 7 to 9 is substantially the same as described with reference to the embodiment shown in FIGS. 1 to 6.

Figure 10:
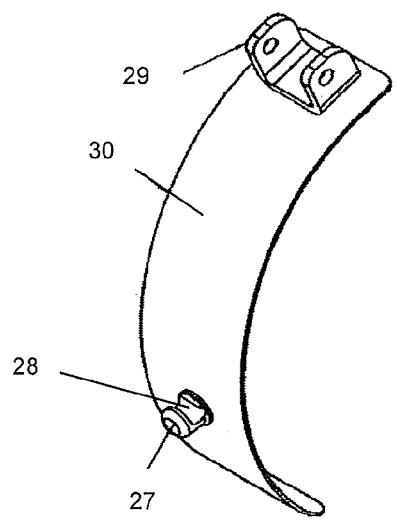
FIG. 10 is a perspective view of a part of the embodiment of the clamp shown in FIGS. 7 to 9.

FIG. 10 is a detailed view of the base plate 20 which comprises one of the pegs 27 for receiving the D-shaped ring of the strap 21 and one of the saddle formation 29 for pivotally mounting the lever mechanism. The inside face of each base plate 20 may comprise a sealing medium or alternatively, and in a situation in which multiple clamping devices are fitted to one pipe, an additional sealing medium 46, as best seen in FIGS. 8 and 9, may extend between separate installations of the clamping device.

Figure 12:
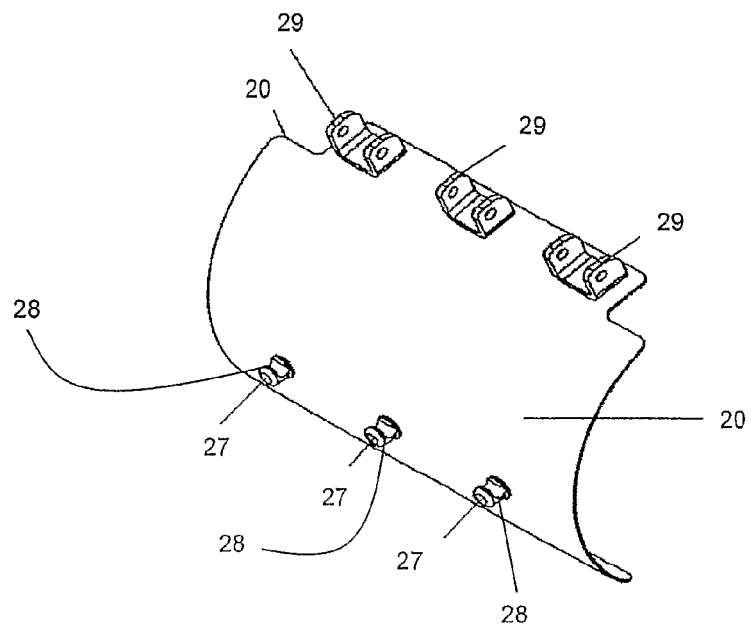
FIG. 12 is a side view of an alternate part that could be used on the embodiments shown in FIGS. 1 to 9.

FIG. 12 is a side view of a base plate 20 having an alternative peg formation 27. Specifically, the peg formation 27 has a leading ramp over which the D-shaped formation 31 can slide prior to being received by the recess 28. The leading ramp may have a rounded outer profile as shown in FIG. 11, or alternatively a progressively tapering profile.

FIGS. 18 to 21 illustrate yet another embodiment that is the same, save for one major difference, as the embodiment shown in FIGS. 1 to 6 and 14 to 17. The notable difference is the inclusion of a locking mechanism for selectively locking the handle 30*a* in a loaded working position. When locked, the locking mechanism prevents the handle 30*a* from moving and being inadvertently or unintentionally released in a direction opposite to the direction of the arrow shown in FIG. 20.

In the case of the embodiment shown in FIGS. 18 to 21, the locking mechanism is in the form of a strap 51 that is a continuation or extension of the strapping 21. In practice, the strap 51 is fitted to the end of the handle 30*a* and tensioned to prevent movement of the handle 30*a*. Suitably, the locking mechanism also includes a clasp 52 to which the strap 51 is adjustably secured. The clasp 52 includes an eyelet formation which can be placed over the end of the handle 30*a* which may also have a corresponding lip to help retain the clasp 52 and strap 51 in position on the end of the handle 30*a*. Like the clasp 22, the clasp 51 also includes a releasable flap and an abutment surface between which the strap 51 slides by pulling on the free end of the strap 51 to tension the strap 51 between the clasps 22 and 51 and thereby lock the handle 30*a* in the loaded working position. The locking mechanism is released by opening up the flap of the clasp 51.

Figure 18:
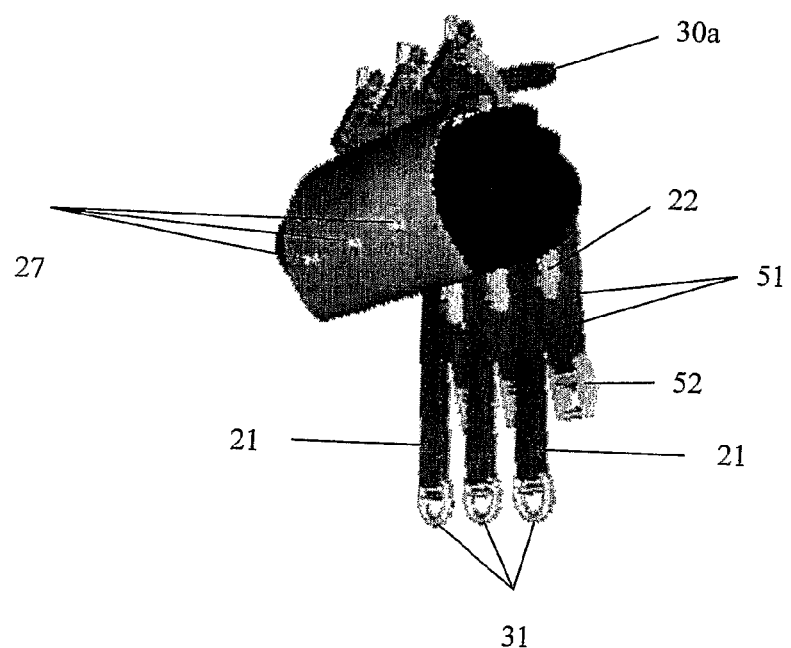
FIG. 18 is a schematic underneath view of a clamp according to another embodiment being fitted to a pipe, the clamp comprising of three wrapping assemblies each including a disconnected strap and a tension device in the form of an over centre lever mechanism comprising a pivoting handle located in a unloaded neutral position.
Figure 19:
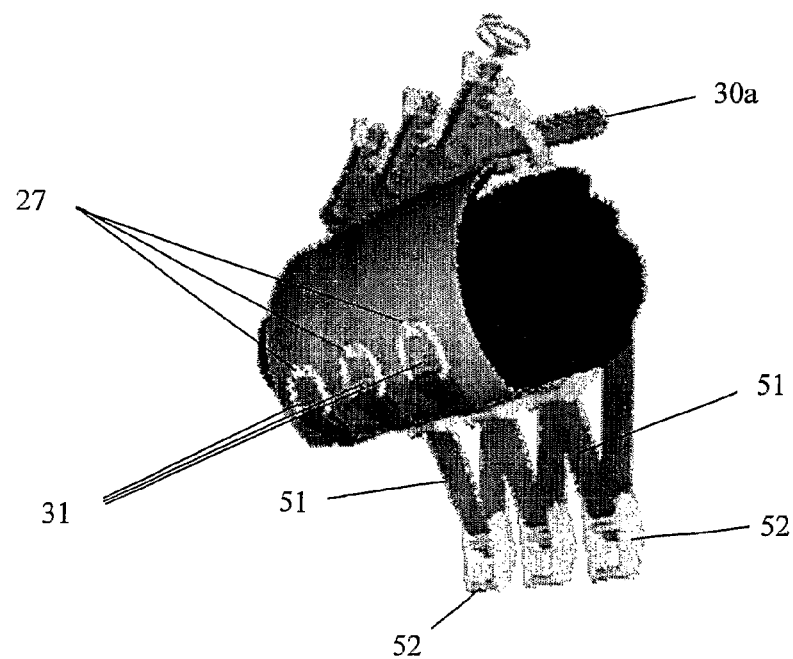
FIG. 19 is the schematic view shown in FIG. 18 with the straps connected to a base plate of the wrapping assembly and wing nuts on the handle tightened in the direction of the arrow.
Figure 20:
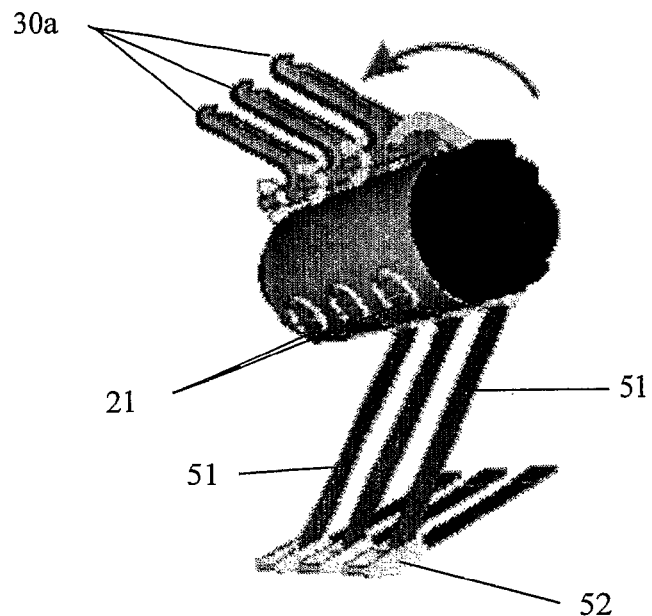
FIG. 20 is the schematic view shown in FIGS. 18 and 19, wherein the handle is in the process of being pivoted in the direction of the arrow into a loaded working position.
Figure 21:
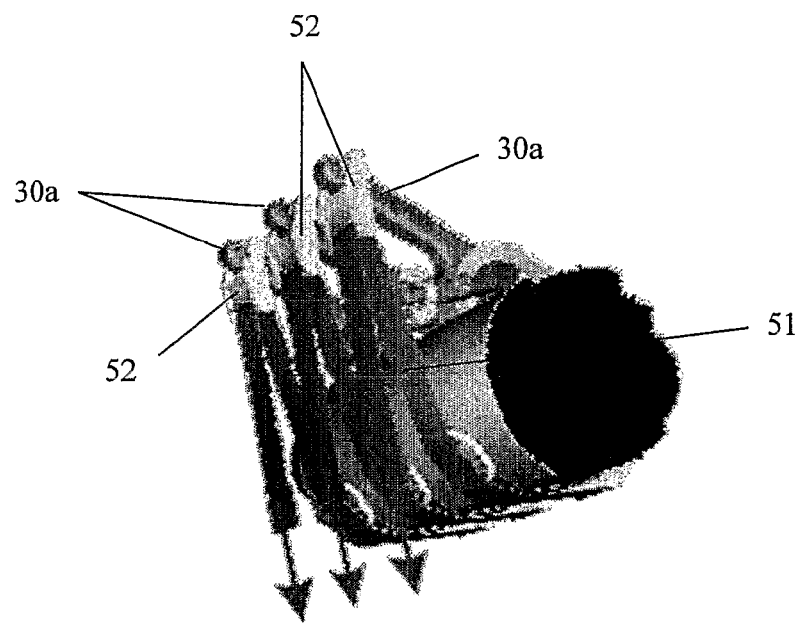
FIG. 21 is the schematic view shown in FIGS. 18 to 20, wherein the handle is located in the loaded working position and the straps fitted to an end of the handles to prevent the handles from being unintentionally moved from the loaded working position to a neutral unloaded position.

FIGS. 18 and 19 illustrate a sequence of steps involving positioning the clamp on a pipe and securing the D-shaped formations 31 to the pegs 27 of the base plates 20. The strapping 21 then undergoes initial tensioning by sliding the strapping 21 through the clasp 22. In addition, the wing nut can be rotated as shown in the FIG. 18 to adjust the purchase provided by the over centre lever prior to engaging the lever. The lever, and in particular, the handle of the lever is moved in the direction shown by the arrow in FIG. 19 to place the clamp into a loaded working position on the pipe. Finally as shown in FIG. 20, the clasp 52 is placed in the end of the handle 30*a* and the free end of the strap 51 pulled to tension the strapping 52 between the clasps 22 and 51, and thereby lock the handle 30*a* in a loaded working position until the flap of the clasp 52 is opened.

Although it is possible that each of the components of the clamping device may be made of a specialised material to facilitate the function of each component, it is envisage that the entire clamping device may be made from 316 grade stainless steel.

The preferred embodiments provide a number of advantages over clamping devices presently available such as the following.

The clamp does not require an inventory of consumable and one use only components. Rather, the preferred embodiments are temporarily fitted, and thereafter removed and then reused to temporarily patch another rupture at a future time.

The clamp comprises two levels of size adjustments, namely coarse and fine level adjustment such that the clamp can be readily used in different applications and for sealing different pressure pipelines.

The clamp does not require cutting strapping either during installing or during removal of the clamp and, therefore, does not possess the inherent risks associated with exposed edges of cut strapping.

The clamp is capable of being fitted to a range of pipe sizes including pipelines 4 to 6 inches in diameter. The clamp may also be fitted to pipes of other diameters and may be scaled up and down accordingly.

Moreover, the clamp is adapted to be fitted in emergency situations and in the shortest possible time frame.

Those skilled in the art of the present invention will appreciate that many variations and modifications may be made to the preferred embodiments without departing from the scope of the present invention.

In the claims which follow and in the proceeding description of the invention, except where the context requires otherwise due to expressed language or necessary implication, the word "comprise" or variations such as "comprises" or "comprising" is used in an inclusive sense i.e. to specify the presence of stated features but not to preclude the presence of addition or further features in various embodiments of the invention.

The invention claimed is:

1. A clamp for patching a rupture in a pipe, the clamp comprising:
   a wrapping assembly that can at least partially encircle a pipe and be positioned on a rupture of the pipe, wherein the wrapping assembly includes strapping and an adjustment device that can frictionally engage the strapping at any desired point to selectively set the effective length of the strapping that is wrapped about the pipe; and
   a tensioning device including a lever mechanism that is operable to place the wrapping assembly about the pipe under different tensions so as to allow pressure applied by the wrapping assembly to the rupture to be adjusted, wherein
   the lever mechanism is an over center lever mechanism having
      i) a handle that is pivotally connected to the wrapping assembly at a first pivot point, and
      ii) a linkage arm that is pivotally connected to the handle at a second pivot point and the second pivot point passes over the first pivot point when operating the lever mechanism between a loaded working position in which the wrapping assembly is located in a circumferentially contracted state and an unloaded neutral position in which the wrapping assembly is located in a circumferentially expanded state.

2. The clamp according to claim 1, wherein the strapping is arranged in a loop in which the strapping extends from the adjustment device and loops back and through the adjustment device so that the effective length of strapping is formed by two sub-sections of strapping.

3. The clamp according to claim 1, wherein the lever mechanism includes an adjustor for adjusting the purchase of the lever mechanism and, in turn, enabling the tension in the strapping to be tension as desired.

4. The clamp according to claim 3, wherein the adjustor is operable to move the location of the second pivot point either along the handle and/or along the linkage arm in a continuous progression.

5. The clamp according to claim 3, wherein to increase the load on the lever mechanism, the adjustor is operable to move the second pivot point away from the first pivot point of the handle to the wrapping assembly and to reduce the load on the lever mechanism, the adjustor is operable to move the second pivot point toward the first pivot of the handle and the wrapping assembly.

6. The clamp according to claim 3, wherein the adjustor includes:
   i) a shaft that is moveable within a housing that forms a part of the handle, and the linkage arm is pivotally connected to the shaft to form the first pivot point; and
   ii) a stopping piece that can be moved along the shaft, and the stopping piece abuts against the housing and is operable to move the first pivot point of connection between the linkage arm and the handle along the housing.

7. The clamp according to claim 6, wherein the shaft is a screw threaded shaft and the stopping piece is a wing nut that is finger adjustable when the lever is in an unloaded neutral position.

8. The clamp according to claim 1, wherein the lever mechanism includes a lock that is operable to prevent the lever mechanism from unintentionally releasing or moving from the loaded working position to the neutral unloaded position.

9. The clamp according to claim 8, wherein the lock includes a strap that is releasably connectable to the lever mechanism to retain the lever mechanism in the loaded working position.

10. The clamp according to claim 1, wherein the linkage arm comprises at least one non-linear member that is shaped to extend over the first pivot point when the handle is located in a loaded working position.

11. The clamp according to claim 1, wherein the lever mechanism includes a cam body that interconnects the linkage arm to the wrapping assembly, and the cam body is pivotally connected to the wrapping assembly at a first spacing from the pipe to which it is fitted, and the cam body is pivotally connected to the linkage arm at a second spacing from the pipe that is greater than the first spacing.

12. The clamp according to claim 2, wherein the adjustment device includes an abutment surface and the strapping can slid through the adjustment device so as to frictionally engage the abutment surface at the desired point along the strapping to selectively set the effective length of the strapping.

13. The clamp according to claim 12, wherein the adjustment device includes a clasp having an open and closable flap and the strapping is wedged between the flap in a closed position and the abutment surface, thereby securing the effective length of the strapping.

14. The clamp according to claim 13, wherein the clasp is configured such that the flap contacts the strapping passing through the clasp and tension in the strapping pulls the strapping in a direction through the clasp that moves the flap toward the abutment surface, thereby wedging the strapping between the flap and the abutment surface.

15. The clamp according to claim 1, wherein the effective length of the strapping encircles at least part of the pipe and passes through the adjustment device, and an end of the strapping extends from the adjustment device and the effective length can be reduced by pulling on the end extending from the adjustment device so as to slide the strapping through the adjustment device.

16. The clamp according to claim 1, wherein the wrapping assembly is releasably connected to the tensioning device to allow the clamp to be installed about the pipe.

17. The clamp according to claim 1, wherein the clamp includes a patch for covering a rupture in the pipe.

18. The clamp according to claim 17, wherein the patch includes a resiliently flexible metal plate or band that and can bend about pipes of various diameters.

19. The clamp according to claim 17, wherein the patch includes a sealing medium on the inside face of the patch to assist in creating a liquid or fluid tight seal when fitted to a pipe.

20. The clamp according to claim 19, wherein the sealing medium is either a rubber or polymeric based material.

21. The clamp according to claim 17, wherein the patch, or a part thereof, is disconnectable of the clamp.

22. The clamp according to claim 17, wherein the strapping is releasably connected to the patch.

23. The clamp according to claim 17, wherein the strapping is releasably connected to the patch by means of a peg extending outwardly from the patch that receives a ring formation at one end of the strapping.

24. The clamp according to claim 1, wherein the clamp comprises at least two wrapping assemblies each having the strapping and the adjustment device for adjusting the effective length of the strapping, the wrapping assemblies also having a single patch for covering a rupture in the pipe to which each respective strapping is releasably connected, and at least two tensioning devices.

25. The clamp according to claim 24, wherein the number of the separate lengths of strapping of the clamp equals the number of the tension devices of the clamp.

26. A clamp for patching a rupture in a pipe, the clamp comprising:
   a wrapping assembly that can at least partially encircle a pipe and be positioned on a rupture of the pipe, wherein the wrapping assembly includes strapping and an adjustment device for adjusting the effective length of the strapping that is wrapped about the pipe; and
   a lever mechanism that can be moved between an unloaded neutral position in which the wrapping assembly is located in an initial circumferentially expanded state and a loaded working position in which the wrapping assembly is located in a circumferentially contracted state, wherein
   the lever mechanism is an over center lever mechanism having
      i) a handle that is pivotally connected to the wrapping assembly at a first pivot point, and
   ii) a linkage arm that is pivotally connected and the second pivot point passes over the first pivot point when operating the lever mechanism between a loaded working position in which the wrapping assembly is located in a circumferentially contracted state and an unloaded neutral position in which the wrapping assembly is located in a circumferentially expanded state.

* * * * *